United States Patent
Lee

(10) Patent No.: US 9,871,410 B2
(45) Date of Patent: Jan. 16, 2018

(54) SWITCHING SELECTOR FOR SELECTING A POWER SOURCE

(71) Applicant: ATEN International Co., Ltd., New Taipei (TW)

(72) Inventor: Yung-Feng Lee, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 126 days.

(21) Appl. No.: 15/015,502

(22) Filed: Feb. 4, 2016

(65) Prior Publication Data

US 2016/0285306 A1    Sep. 29, 2016

(30) Foreign Application Priority Data

Mar. 27, 2015 (TW) .............................. 104204706 U

(51) Int. Cl.
    *H02J 9/06*        (2006.01)
(52) U.S. Cl.
    CPC ..................... *H02J 9/061* (2013.01)
(58) Field of Classification Search
    CPC ....................................................... H02J 9/061
    See application file for complete search history.

(56) References Cited

U.S. PATENT DOCUMENTS

| 6,501,196 B1 * | 12/2002 | Lo ........................... H02J 3/006 307/125 |
| 7,468,566 B2 | 12/2008 | Serrano et al. |
| 7,612,469 B2 * | 11/2009 | Kuo ......................... H02J 9/06 307/64 |
| 8,138,625 B2 * | 3/2012 | Duan .................. G06F 11/2015 307/11 |
| 2001/0017485 A1 * | 8/2001 | Yoo ........................ H02J 3/005 307/66 |
| 2007/0018506 A1 * | 1/2007 | Paik ......................... H02J 9/06 307/115 |
| 2010/0141038 A1 * | 6/2010 | Chapel ................. H01R 25/003 307/64 |

(Continued)

FOREIGN PATENT DOCUMENTS

TW    201014109 A1    4/2010
TW    201019365 A1    5/2010

OTHER PUBLICATIONS

Edvard,"Many engineers advocate the use of mutiple-transfer switches," Mar. 23, 2015, Energy and Power, pp. 1-4.*

*Primary Examiner* — Jared Fureman
*Assistant Examiner* — Pinping Sun
(74) *Attorney, Agent, or Firm* — Chen Yoshimura LLP

(57) ABSTRACT

A switching selector for selecting a power source from two power sources. It includes a controller, a detection circuit, a transistor and two groups of four transfer switches or relays, wherein the controller is a micro-processor and the detection circuit includes two transformers. Primary winding of each of two transformers is connected to two different power sources, and secondary winding of each of two transformers is connected to input of the controller. Output of the controller is connected to a base of a transistor for controlling the transfer switches. Each group of four transfer switches form a redundant switch for selecting one of the two power sources, where the four transfer switches are connected such that the selection function is not affected when any one of the transfer switches malfunctions.

9 Claims, 3 Drawing Sheets

(56) References Cited

U.S. PATENT DOCUMENTS

2012/0299381 A1 11/2012 Larson
2014/0203648 A1 7/2014 Siglock et al.
2016/0197483 A1* 7/2016 Steinert .................. H02J 3/006
                                                          307/18

* cited by examiner

SWITCHING SELECTOR FOR SELECTING A POWER SOURCE

BACKGROUND OF THE INVENTION

Field of the Invention

This invention relates to switching of power sources, and in particular, it relates to a switching selector for selecting a power source.

Description of Related Art

Automatic Transfer Switch (ATS) is a circuit that automatically couples one of two alternating current (AC) power sources to a load circuit. ATS can be used to couple an emergency power generator in a system that is normally supplied by a power grid, so that when the power grid is interrupted, the load can be switched to the emergency generator. The ATS must completely isolate the two input power sources.

Power ATS's are typically used in environments where a second power source is provided, such as electrical equipment or electrical appliances that are supplied by a power generator, a computer server room that requires a large power supply, etc. Normally the power is supplied by a main power supply such as the public power grid; but when the main power supply is unstable or down, the power ATS makes a determination and switches to another available stable power source, such as a power generator or an uninterruptible power supply, to continuously supply power to the electrical equipment or appliances. When the main power source is restored, the ATS makes a determination and switches back to the main power source.

However, in a conventional main power detection circuit and switching control circuit, the selecting switch for selecting the power source uses two relays to select and switch to one of the two power sources to supply the load. A drawback of such a structure is that, when one of the relays is malfunctioning or not functioning, the power source selection cannot be made properly.

A second conventional main power detection circuit and switching control circuit requires acquiring the voltage for a second time to make a second determination to confirm that the output power is provided by the selected power source. The second-time acquisition and determination step delays the output of the correct power source.

SUMMARY

Accordingly, the present invention is directed to a power source switching selector that substantially obviates one or more of the problems due to limitations and disadvantages of the related art.

An object of the present invention is to provide a switching selector for selecting a power source.

According to an aspect of the present invention, a power source selection switch is provided, which includes: a first transfer switch having a first closed contact and a first normally open contact; a second transfer switch having a second closed contact and a second normally open contact, wherein a first contact of the second normally open contact is coupled to the first closed contact; a third transfer switch having a third closed contact and a third normally open contact, where a second contact of the third normally open contact is coupled to the first closed contact; a fourth transfer switch having a fourth closed contact and a fourth normally open contact, where the second closed contact is coupled to a third contact of the fourth normally open contact, and the third closed contact is coupled to the a fourth contact of the fourth normally open contact.

In another aspect, a fifth contact of the first normally open contact is coupled to the first power source, and a sixth contact of the second normally open switch is coupled to the first power source.

In another aspect, a seventh contact of the first normally open contact is coupled to the second power source, and an eighth contact of the third normally open switch is coupled to the second power source.

In another aspect, the power source selection switch further includes a controller respectively coupled to the first transfer switch, the second transfer switch, the third transfer switch and the fourth transfer switch.

In another aspect, the power source selection switch further includes a detection circuit coupled to the controller.

In another aspect, the detection circuit includes at least one transformer having primary windings coupled to the first and the second power source and having secondary windings coupled to input terminals of the controller.

In another aspect, the power source selection switch further includes a transistor coupled to an output terminal of the controller.

In another aspect, the power source selection switch further includes a resistor that couples the transistor to the output terminal of the controller.

Features and advantages of the present embodiments can be further understood from the following descriptions of the embodiments.

BRIEF DESCRIPTION OF THE DRAWINGS

The drawings are provided to illustrate the embodiments of the present invention and do not limit the scope of the invention.

DETAILED DESCRIPTION OF PREFERRED EMBODIMENTS

Embodiments of the present invention are described below with reference to the drawings. While the embodiments are described in specific details, it should be understood that these specific details do not limit the scope of the present invention. In addition to the illustrated embodiment, other embodiments are also possible.

Figure 1:
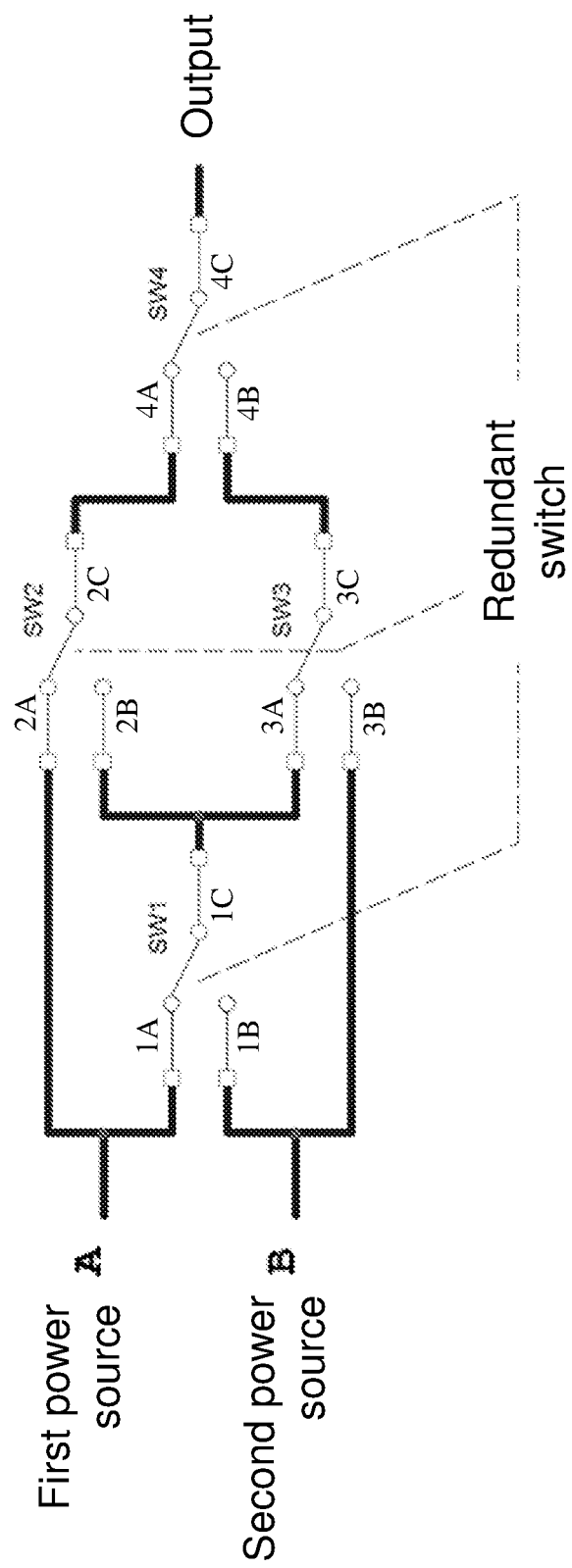
FIG. 1 schematically illustrates a redundant switch circuit for an automatic power source selection switch according to an embodiment of the present invention.

FIG. 1 illustrates a redundant switch for an automatic power source selection switch according to an embodiment of the present invention. The redundant switch forms a switching selector for selecting power sources. The redundant switch includes a first transfer switch SW1, having a first closed contact 1C and a first normally open contact; a second transfer switch SW2, having a second closed contact 2C and a second normally open contact, where a contact 2B (first contact) of the second normally open contact is coupled to the first closed contact 1C; a third transfer switch SW3, having a third closed contact 3C and a third normally open contact, where a contact 3A (second contact) of the third normally open contact is coupled to the first closed contact 1C; a fourth transfer switch SW4, having a fourth closed contact 4C and a fourth normally open contact, where the second closed contact 2C of the second transfer switch SW2 is coupled to the contact 4A (third contact) of the fourth normally open contact, and the third closed contact 3C of the third transfer switch SW3 is coupled to the contact 4B (fourth contact) of the fourth normally open contact.

A contact 1A (fifth contact) of the first normally open contact is coupled to the first power source, and the contact 2A (sixth contact) of the second normally open switch is coupled to the first power source. A contact 1B (seventh contact) of the first normally open contact is coupled to the second power source, and the contact 3B (eighth contact) of the third normally open switch is coupled to the second power source. The contact 2B (first contact) of the second normally open contact is coupled to the first closed contact 1A of the first transfer switch SW1 and the contact 3A (second contact) of the third normally open switch. The fourth closed contact 4C is coupled to an output terminal.

A controller is respectively coupled to the first transfer switch SW1, the second transfer switch SW2, the third transfer switch SW3 and the fourth transfer switch SW4.

Figure 2:
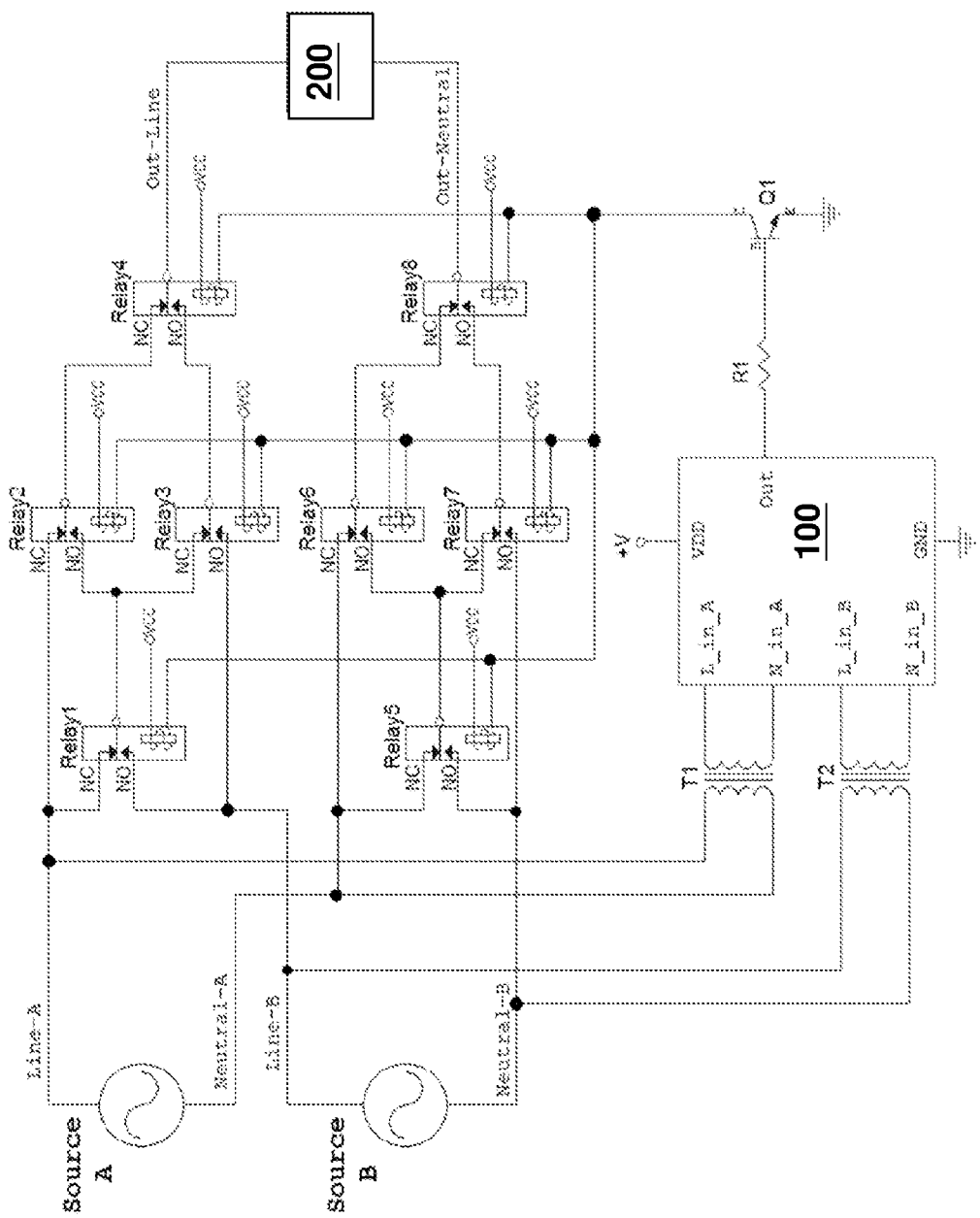
FIG. 2 schematically illustrates the automatic power source selection switch according to an embodiment of the present invention.

FIG. 2 schematically illustrates the power source selection switch according to an embodiment of the present invention, which includes controller 100, such as a microprocessor; a detection circuit, including two transformers T1 and T2; a transistor Q1; eight relays or switches, taking relays as examples here, respectively labeled Relay1 to Relay8.

The relays may by any suitable relays, such as voltage relays, current relays, temperature relays, velocity relay, time relay, pressure relay, electromagnetic relay, inductance relay, solid-state relay, Reed relay, optical relay, thermal Reed relay, etc., which can be selected based on different application requirements.

The detection circuit is coupled to the controller 100, where the primary windings of the transformers T1 and T2 (primary side) are respectively coupled to the line wire (Line-A) and neutral wire (Neutral-A) of the first power source A and the line wire (Line-B) and neutral wire (Neutral-B) of the second power source B, and the secondary windings of the transformers T1 and T2 (secondary side) are respectively coupled to the input terminals L_in_A and L_in_B of the controller 100. The transistor Q1 is coupled to the output terminal of the controller 100. The power source selection switch further includes a resistor that couples the transistor Q1 to the output terminal of the controller 100.

The coupling of the four relays Relay1, Relay2, Relay3 and Relay4 is the same as the coupling of the redundant switch (including switches SW1, SW2, SW3 and SW4) described earlier. The coupling of the four relays Relay5, Relay6, Relay1 and Relay8 is the same as the coupling of redundant switch (including switches SW1, SW2, SW3 and SW4) described earlier. The four relays Relay2, Relay2, Relay3 and Relay4 are coupled to the line wire Line-A of the first power source A and the line wire Line-B of the second power source B, and the four relays Relay5, Relay6, Relay7 and Relay8 are coupled to the neutral wire Neutral-A of the first power source A and the neutral wire Neutral-B of the second power source B.

In this embodiment, the power source selection switch can be used with two input power sources A and B, to selectively couple one of the two power sources to the output end. In operation, the first power source A is stepped down by the first transformer T1 and then coupled to the terminals L_in_A and N_in_A of the controller 100, and the second power source B is stepped down by the first transformer T2 and then coupled to the terminals L_in_B and N_in_B of the controller 100. The controller 100 obtains the output voltages of the transformers T1 and T2, and calculates the actual voltage values of the power sources A and B. Then, the controller 100 determines the voltage levels, and outputs a signal to control the transistor Q1 to operate the relays to pull or release them, so as to select the appropriate power source to be output to the load 200.

In this embodiment, the selection switch formed by four relays has the advantage that it can tolerate the malfunction of one relay without affecting the operation of the entire selection switch.

In the circuit formed by the four relays, one relay can malfunction but the entire selection switch can operate normally. A characteristic of the selection switch is that the entire group of eight relays are pulled or released together. In normal operation, the output terminal Out of the controller 100 outputs a low voltage, and the transistor Q1 does not conduct, so the relays are not pulled, i.e., they are all coupled to their NC terminals. Thus, the power source A is outputted to the load 200 via relays Relay2 and Relay4.

When the power source A is abnormal, the controller 100 determines that power source B should be selected to supply power. At this time, the controller 100 outputs a high voltage to make the transistor Q1 conduct, which causes the four relays to be pulled to their NO terminals. Thus, the power source B is outputted to the load 200 via relays Relay3 and Relay4. In such a condition, if any one of the relays is malfunctioning and not pulled (i.e. still coupled to its NC terminal), the other relays can perform the function in lieu of the malfunctioning relay to correctly output the power source B to the load 200, in the following ways:

If Relay1 malfunctions, the power source B is output to the load 200 via the NO terminal of Relay3 and the NO terminal of Relay4.

If Relay2 malfunctions, the power source B is output to the load 200 via the NO terminal of Relay3 and the NO terminal of Relay4.

If Relay3 malfunctions, the power source B is output to the load 200 via the NO terminal of Relay1, then the NC terminal of Relay3, and the NO terminal of Relay4.

If Relay4 malfunctions, the power source B is output to the load 200 via the NO terminal of Relay1, then the NO terminal of Relay2, and the NC terminal of Relay4.

When the power source A is normal (e.g. when the power source B is abnormal, or when the power source A is a default source and it has become normal again), the controller 100 determines that power source A should be selected to supply power. At this time, the controller 100 outputs a low voltage so the transistor Q1 so the transistor does not conduct; as a result the four relays are not pulled, i.e. they are all coupled to their NC terminals. Thus, the power source A is outputted to the load 200 via relays Relay2 and Relay4. In such a condition, if any one of the relays is malfunctioning and is pulled abnormally (i.e. becomes coupled to its NO terminal), the other relays can perform the function in lieu of the malfunctioning relay to correctly output the power source A to the load 200, in the following ways:

If Relay1 malfunctions, the power source A is output to the load 200 via the NC terminal of Relay2 and the NC terminal of Relay4. If Relay2 malfunctions, the power source A is output to the load 200 via the NC terminal of Relay1, then the NO terminal of Relay2, and the NC terminal of Relay4.

If Relay3 malfunctions, the power source A is output to the load 200 via the NC terminal of Relay2 and the NC terminal of Relay4.

If Relay4 malfunctions, the power source A is output to the load 200 via the NC terminal of Relay1, then the NC terminal of Relay3, and the NO terminal of Relay4.

From the above descriptions of the various situations, it can be seen that in the selection switch formed by four relays, when any one relay malfunctions, the entire system can still properly function without interruption in the supply of power.

Figure 3:
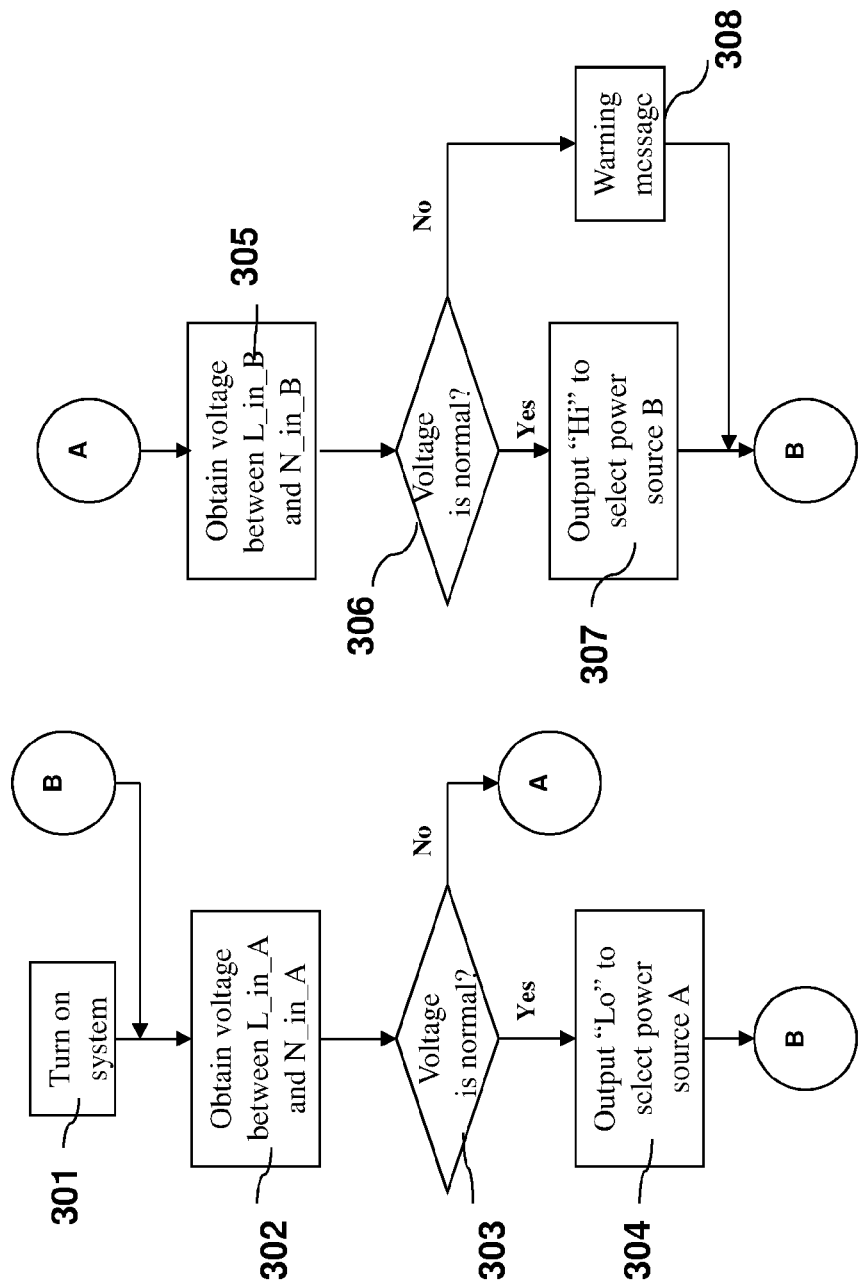
FIG. 3 schematically illustrates a control process for the automatic power source selection switch according to an embodiment of the present invention.

FIG. 3 schematically illustrates a control process of the automatic power source selection switch according to an embodiment of the present invention. In this embodiment, the power source selection switch is coupled to two input power sources A and B, and selects one of them for output to the output end. The control process includes: First, in step 301, the system is turned on. The power source A is stepped down by the transformer T1 and then coupled to the L_in_A and N_in_A terminals of the controller 100. In step 302, the controller 100 obtains the voltage between L_in_A and N_in_A. In step 303, the controller 100 determines the voltage levels. If the voltage level is normal, then in step 304, the output terminal Out of the controller outputs a low voltage "Lo," so the power source A is selected for output.

If the voltage is abnormal, then the process goes to step 305. The power source B is stepped down by the transformer T2 and then coupled to the L_in_B and N_in_B terminals of the controller 100. In step 305, the controller 100 obtains the voltage between L_in_B and N_in_B. In step 306, the controller 100 determines the voltage levels. If the voltage level is normal, then in step 307, the output terminal Out of the controller outputs a high voltage "Hi," so the power source B is selected for output. If the voltage level is abnormal, then in step 308 a warning is generated, to indicate that the automatic power source selection switch is no longer functioning properly.

As described above, the controller 100 obtains the output voltages of the transformers T1 and T2, and calculates the actual voltages of the power sources A and B. Then, the controller 100 determines the voltage levels, and outputs a control signal to the transistor Q1 to cause the relays to pull or release, so that the appropriate power source is selected for output to the load 200.

As shown in FIG. 2, an advantage of the automatic power source selection switch of the present embodiments of the present invention is that, the circuit formed by the four relays can permit one relay to malfunction, as the other relays can replace the function of the malfunctioning relay and output the desired power source to the load. Also, unlike the second conventional main power detection and switching control circuit discussed earlier in the Background portion, in embodiments of the present invention, it is not necessary to perform a second-time detection and determination to confirm that the output voltage is normal, so the switching can be performed without delay.

The power source selection switch described here can be used to select one from two power sources A and B, or from more than two power sources. Four relays or switches form a group of redundant switches; if the number of power sources increases, the number of groups of redundant switches will increase too.

The power source selection switch according to embodiments of the present invention has the following advantages:

1. When any one of switches SW1 to SW4 malfunctions, the other three switches can replace the switching function of the malfunctioning switch, so the power output is not affected.

2. It does not require a second time determination, as explained above. Further, the life of the overall system is extended to almost twice the life of a switch SW.

Various modification and variations can be made in the power source selection switch and related operation method of the present invention without departing from the spirit or scope of the invention. Thus, it is intended that the present invention cover modifications and variations that come within the scope of the appended claims and their equivalents.

What is claimed is:

1. A power source selection switch, comprising:
    a first transfer switch having a first closed contact and a first normally open contact;
    a second transfer switch having a second closed contact and a second normally open contact, wherein a first contact of the second normally open contact is coupled to the first closed contact;
    a third transfer switch having a third closed contact and a third normally open contact, where a second contact of the third normally open contact is coupled to the first closed contact; and
    a fourth transfer switch having a fourth closed contact and a fourth normally open contact, where the second closed contact is coupled to a third contact of the fourth normally open contact, and the third closed contact is coupled to a fourth contact of the fourth normally open contact,
    wherein a fifth contact of the first normally open contact is coupled to the first power source, a sixth contact of the second normally open contact is coupled to the first power source, a seventh contact of the first normally open contact is coupled to the second power source, and an eighth contact of the third normally open contact is coupled to the second power source.

2. The power source selection switch of claim 1, wherein the fourth closed contact is coupled to an output terminal.

3. The power source selection switch of claim 1, further comprising a controller respectively coupled to the first, second, third and fourth transfer switches.

4. The power source selection switch of claim 3, further comprising a detection circuit coupled to the controller.

5. The power source selection switch of claim 4, wherein the detection circuit includes at least one transformer.

6. The power source selection switch of claim 5, wherein the at least one transformer has primary windings coupled to the first and the second power source, and has secondary windings coupled to input terminals of the controller.

7. The power source selection switch of claim 6, further comprising a transistor coupled to an output terminal of the controller.

8. The power source selection switch of claim 7, further comprising a resistor that couples the transistor to the output terminal of the controller.

9. The power source selection switch of claim 1, wherein the first, second, third and fourth transfer switches are first, second, third and fourth relays.

* * * * *